United States Patent
Okada et al.

(10) Patent No.: US 9,447,226 B2
(45) Date of Patent: Sep. 20, 2016

(54) COMPOSITION FOR OPTICAL MATERIAL, AND METHOD FOR PRODUCING SAME

(71) Applicant: MITSUBISHI GAS CHEMICAL COMPANY, INC., Tokyo (JP)

(72) Inventors: Hiroyuki Okada, Osaka (JP); Hiroshi Horikoshi, Chiba (JP); Eiji Koshiishi, Chiba (JP); Teruo Kamura, Chiba (JP)

(73) Assignee: MITSUBISHI GAS CHEMICAL COMPANY, INC., Tokyo (JP)

(*) Notice: Subject to any disclaimer, the term of this patent is extended or adjusted under 35 U.S.C. 154(b) by 0 days.

(21) Appl. No.: 14/414,585

(22) PCT Filed: Sep. 6, 2013

(86) PCT No.: PCT/JP2013/074029
§ 371 (c)(1),
(2) Date: Jan. 13, 2015

(87) PCT Pub. No.: WO2014/038654
PCT Pub. Date: Mar. 13, 2014

(65) Prior Publication Data
US 2015/0166720 A1    Jun. 18, 2015

(30) Foreign Application Priority Data

Sep. 10, 2012 (JP) ................. 2012-198428
Dec. 26, 2012 (JP) ................. 2012-282083

(51) Int. Cl.
C08G 18/75 (2006.01)
C08G 18/16 (2006.01)
C08G 18/38 (2006.01)
G02B 1/04 (2006.01)

(52) U.S. Cl.
CPC ........... *C08G 18/757* (2013.01); *C08G 18/168* (2013.01); *C08G 18/3855* (2013.01); *C08G 18/3874* (2013.01); *C08G 18/3876* (2013.01); *G02B 1/04* (2013.01)

(58) Field of Classification Search
None
See application file for complete search history.

(56) References Cited

U.S. PATENT DOCUMENTS

| 6,472,495 B1* | 10/2002 | Yoshimura ......... C08G 18/3876 528/73 |
| 7,091,307 B2 | 8/2006 | Yoshimura et al. |
| 8,575,293 B2 | 11/2013 | Horikoshi et al. |
| 2003/0225202 A1* | 12/2003 | Kosaka ................ C08G 18/246 524/589 |
| 2004/0122201 A1 | 6/2004 | Yoshimura et al. |
| 2005/0124783 A1* | 6/2005 | Morijiri ................ C08G 65/22 528/377 |
| 2010/0004421 A1 | 1/2010 | Horikoshi et al. |
| 2012/0123081 A1 | 5/2012 | Okada et al. |

FOREIGN PATENT DOCUMENTS

| CN | 1405198 | 3/2003 |
| CN | 101495531 | 7/2009 |
| EP | 2455413 | 5/2012 |
| EP | 2805949 | 11/2014 |
| JP | 9-110979 | 4/1997 |
| JP | 11-352302 | 12/1999 |
| JP | 2001-131257 | 5/2001 |
| JP | 2001-330701 | 11/2001 |
| JP | 2002-122701 | 4/2002 |
| JP | 2003-48883 | 2/2003 |
| JP | 2004-339329 | 12/2004 |
| JP | 2005-220162 | 8/2005 |
| JP | 2007-84629 | 4/2007 |
| JP | 2007-90574 | 4/2007 |
| JP | 2007-277438 | 10/2007 |
| WO | 2011/007749 | 1/2011 |

OTHER PUBLICATIONS

Search report from PCT/JP2013/074029, mail date is Oct. 1, 2013.
Extended European Search Report issued in Patent Application No. 13835334.7, dated Mar. 9, 2016.

* cited by examiner

Primary Examiner — Jeffrey Washville
(74) Attorney, Agent, or Firm — Greenblum & Bernstein, P.L.C.

(57) ABSTRACT

A composition for an optical material includes (a) a compound having two β-epithiopropyl groups and having a specific structure, (b) a compound having one β-epithiopropyl group and one glycidyl group and having a specific structure, (c) polyisocyanate and (d) polythiol, enables the prevention of the occurrence of such a defect that peeling traces linger on a lens. In the composition for an optical material, an embodiment in which (e) sulfur is additionally contained is preferred. Another embodiment of the present invention is a method for producing an optical material, characterized by adding an onium salt as a polymerization catalyst to the composition for an optical material in an amount of 0.0001 to 10% by mass relative to the total amount of the compound (a), the compound (b), polyisocyanate (c) and polythiol (d) and then polymerizing and curing the resultant mixture.

10 Claims, No Drawings

COMPOSITION FOR OPTICAL MATERIAL, AND METHOD FOR PRODUCING SAME

TECHNICAL FIELD

The composition for optical materials of the present invention is suitably used for an optical material for a plastic lens, a prism, an optical fiber, an information recording substrate, a filter or the like, in particular for a plastic lens.

BACKGROUND ART

Plastic lenses are lightweight, highly tough and easy to be dyed. Properties particularly required for plastic lenses are: low specific gravity; high transparency; low yellowness; high refractive index and high Abbe number as optical properties; high heat resistance; high strength; and the like. A high refractive index allows a lens to be thinner, and a high Abbe number reduces the chromatic aberration of a lens.

Recently, many organic compounds having a sulfur atom to be used for providing a high refractive index and a high Abbe number have been reported. Among such compounds, polyepisulfide compounds having a sulfur atom are known to provide a good balance between the refractive index and the Abbe number (Patent Document 1).

In addition, optical materials in which thiourethane was introduced in a polyepisulfide compound in order to improve the strength have been reported (Patent Documents 2 and 3).

However, when thiourethane is introduced, it causes reduction in heat resistance, generation of odor at the time of cutting work, occurrence of white turbidity of lenses and occurrence of uneven polymerization called striae, and for this reason, techniques in which a composition ratio is limited or a viscosity is limited have been reported (Patent Documents 4-6).

Further, there is a report of an optical material, in which sulfur was introduced in a polyepisulfide compound in order to maintain the refractive index and thiourethane was introduced in the compound in order to improve impact resistance (Patent Document 7).

However, optical materials obtained by introducing sulfur and thiourethane in a polyepisulfide compound have problems of foam formation, heat generation, etc. at the time of the production. For this reason, there is a report of a method for producing an optical material, in which a product obtained by preliminarily polymerizing an episulfide compound with a sulfur atom is reacted with a product obtained by preliminarily polymerizing a compound having an isocyanate group with a compound having a mercapto group, for the purpose of controlling the above-described problems (Patent Document 8).

Further, a method for prescribing a formulation method for the purpose of suppressing white turbidity and uneven polymerization called striae of lenses obtained has been reported (Patent Document 9).

PRIOR ART DOCUMENTS

Patent Documents

Patent Document 1: Japanese Laid-Open Patent Publication No. H09-110979
Patent Document 2: Japanese Laid-Open Patent Publication No. H11-352302
Patent Document 3: Japanese Laid-Open Patent Publication No. 2001-131257
Patent Document 4: Japanese Laid-Open Patent Publication No. 2001-330701
Patent Document 5: Japanese Laid-Open Patent Publication No. 2005-220162
Patent Document 6: Japanese Laid-Open Patent Publication No. 2007-090574
Patent Document 7: Japanese Laid-Open Patent Publication No. 2002-122701
Patent Document 8: Japanese Laid-Open Patent Publication No. 2004-339329
Patent Document 9: International Publication WO2011/007749 pamphlet

SUMMARY OF THE INVENTION

Problems to be Solved by the Invention

However, in the production of the above-described optical materials, particularly plastic lenses for eyeglasses, the yield is reduced due to a defect where peeling traces are left, and it is required to improve this. A defect where peeling traces are left is a defect where peeling traces are left on a lens when released from a mold after polymerization and curing, and when this occurs, it becomes impossible to use the product as a lens. Such a defect where peeling traces are left occurs particularly in the case of powerful minus lenses, and the improvement thereof has been desired.

That is, the problem to be solved by the present invention is to provide a composition for optical materials which can improve reduction in the yield due to a defect where peeling traces are left when producing an optical material having a high refractive index, a method for producing the composition for optical lens. In particular, for producing an optical material, an optical material and an optical lens. In particular, suppression of a defect where peeling traces are left in powerful minus lenses is provided.

Means for Solving the Problems

Under such circumstances, the present inventors diligently made researches and found that the above-described problems can be solved by the below-described means, and thus the present invention was achieved:

<1> A composition for optical materials, which comprises (a) a compound described below, (b) a compound described below, (c) a polyisocyanate and (d) a polythiol:

the compound (a): a compound having the structure represented by the following formula (1):

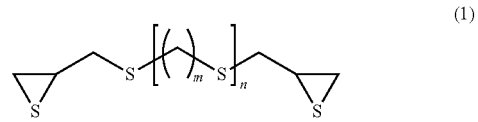

wherein m represents an integer from 0 to 4, and n represents an integer from 0 to 2; and the compound (b): a compound having the structure represented by the following formula (2):

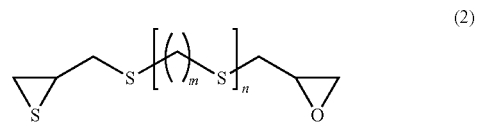

wherein m represents an integer from 0 to 4, and n represents an integer from 0 to 2.

<2> The composition for optical materials according to item <1>, wherein the polyisocyanate (c) is at least one compound selected from the group consisting of isophorone diisocyanate, tolylene diisocyanate, diphenylmethane diisocyanate, hexamethylene diisocyanate, m-xylylene diisocyanate, p-xylylene diisocyanate, m-tetramethyl xylylene diisocyanate, p-tetramethyl xylylene diisocyanate, 1,3-bis(isocyanatemethyl)cyclohexane, 1,4-bis(isocyanatemethyl)cyclohexane, bis(isocyanatemethyl)norbornene and 2,5-diisocyanatemethyl-1,4-dithiane, and the polythiol (d) is at least one compound selected from the group consisting of bis(2-mercaptoethyl)sulfide, 2,5-dimercaptomethyl-1,4-dithiane, 1,3-bis(mercaptomethyl)benzene, 1,4-bis(mercaptomethyl)benzene, 4-mercaptomethyl-1,8-dimercapto-3,6-dithiaoctane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,3,3-tetrakis(mercaptomethylthio)propane, pentaerythritol tetrakis-mercaptopropionate, pentaerythritol tetrakis-thioglycolate, trimethylolpropane tris(thioglycolate) and trimethylolpropane tris(mercapto propionate).

<3> The composition for optical materials according to item <1> or <2>, wherein, when the total amount of the compound (a), the compound (b), the polyisocyanate (c) and the polythiol (d) is 100% by mass, the compound (a) is in an amount of 50 to 95% by mass; the compound (b) is in an amount of 0.05 to 20% by mass; the polyisocyanate (c) is in an amount of 1 to 25% by mass; and the polythiol (d) is in an amount of 1 to 25% by mass, and wherein the ratio of the SH groups in the polythiol (d) to the NCO groups in the polyisocyanate (c), i.e., [the number of the SH groups in the polythiol (d)/the number of the NCO groups in the polyisocyanate (c)](SH group/NCO group) is 1.0 to 2.5.

<4> The composition for optical materials according to item <1> or <2>, further comprising (e) a sulfur.

<5> The composition for optical materials according to item <4>, wherein, when the total amount of the compound (a), the compound (b), the polyisocyanate (c), the polythiol (d) and the sulfur (e) is 100% by mass, the compound (a) is in an amount of 50 to 95% by mass; the compound (b) is in an amount of 0.05 to 20% by mass; the polyisocyanate (c) is in an amount of 1 to 25% by mass; the polythiol (d) is in an amount of 1 to 25% by mass; and the sulfur (e) is in an amount of 0.1 to 15% by mass, and wherein the ratio of the SH groups in the polythiol (d) to the NCO groups in the polyisocyanate (c), i.e., [the number of the SH groups in the polythiol (d)/the number of the NCO groups in the polyisocyanate (c)](SH group/NCO group) is 1.0 to 2.5.

<6> A method for producing an optical material, which comprises the steps of:
  adding an onium salt, as a polymerization catalyst, to the composition for optical materials according to any one of items <1> to <3> in an amount of 0.0001 to 10% by mass relative to the total amount of the compound (a), the compound (b), the polyisocyanate (c) and the polythiol (d); and
  polymerizing and curing the resultant mixture.

<7> A method for producing an optical material, which comprises the steps of:
  adding an onium salt, as a polymerization catalyst, to the composition for optical materials according to item <4> or <5> in an amount of 0.0001 to 10% by mass relative to the total amount of the compound (a), the compound (b), the polyisocyanate (c), the polythiol (d) and the sulfur (e); and
  polymerizing and curing the resultant mixture.

<8> An optical material obtained by the production method according to item <6> or <7>.

<9> An optical lens comprising the optical material according to item <8>.

<10> A method for producing the composition for optical materials according to item <1>, which comprises the steps of:
  reacting an epoxy compound represented by formula (3) below with thiourea to obtain a mixture of the compound (a) and the compound (b); and
  mixing the mixture with the polyisocyanate (c) and the polythiol (d):

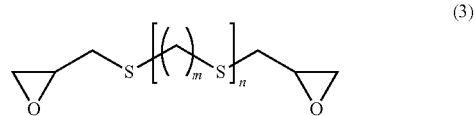

(3)

wherein m represents an integer from 0 to 4, and n represents an integer from 0 to 2.

<11> A method for producing the composition for optical materials according to item <4>, which comprises the steps of:
  reacting an epoxy compound represented by formula (3) below with thiourea to obtain a mixture of the compound (a) and the compound (b); and
  mixing the mixture with the polyisocyanate (c), the polythiol (d) and the sulfur (e):

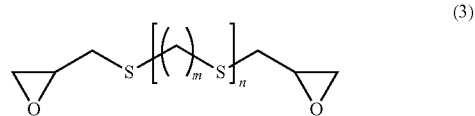

(3)

wherein m represents an integer from 0 to 4, and n represents an integer from 0 to 2.

Advantageous Effect of the Invention

By using the composition for optical materials of the present invention, it is possible to provide an optical material, which has a balance between a sufficiently high refractive index and a good Abbe number and can improve reduction in the yield due to a defect where peeling traces are left, which was difficult to obtain when using compounds of prior art as raw materials. In particular, it is possible to provide suppression of a defect where peeling traces are left in powerful minus lenses.

EMBODIMENTS FOR CARRYING OUT THE INVENTION

The present invention is a composition for optical materials comprising the compound (a), the compound (b), a polyisocyanate (c) and a polythiol (d). Further, a preferred embodiment of the present invention is a composition for optical materials comprising the compound (a), the compound (b), a polyisocyanate (c), a polythiol (d) and a sulfur (e).

Hereinafter, raw materials to be used in the present invention, i.e., the compound (a), the compound (b), the polyisocyanate (c) (hereinafter sometimes referred to as "the compound (c)"), the polythiol (d) (hereinafter sometimes referred to as "the compound (d)") and the sulfur (e) (hereinafter sometimes referred to as "the compound (e)") will be described in detail.

The compound (a) to be used in the present invention is a compound having the structure represented by the aforementioned formula (1). When the total amount of the compounds (a) to (d) (compounds (a) to (e) when the sulfur (e) is contained) is 100% by mass, the amount of the compound (a) to be added is usually 50 to 95% by mass, preferably 55 to 90% by mass, and particularly preferably 60 to 85% by mass. When the amount of the compound (a) to be added is less than 50% by mass, the heat resistance may be reduced, and when the amount is more than 95% by mass, the strength may be reduced.

Specific examples of the compound (a) include episulfides such as bis(β-epithiopropyl)sulfide, bis(β-epithiopropyl)disulfide, bis(β-epithiopropylthio)methane, 1,2-bis(β-epithiopropylthio)ethane, 1,3-bis(β-epithiopropylthio)propane and 1,4-bis(β-epithiopropylthio)butane. As the compound (a), such compounds may be used solely, or two or more compounds may be used in combination.

Among the above-described compounds, bis(β-epithiopropyl)sulfide (n=0 in formula (1)) and bis(β-epithiopropyl)disulfide (m=0 and n=1 in formula (1)) are preferred, and bis(β-epithiopropyl)sulfide (n=0 in formula (1)) is most preferred.

The compound (b) to be used in the present invention is a compound having the structure represented by the aforementioned formula (2). When the total amount of the compounds (a) to (d) (compounds (a) to (e) when the sulfur (e) is contained) is 100% by mass, the amount of the compound (b) to be added is usually 0.05 to 20% by mass, preferably 0.05 to 15% by mass, more preferably 0.1 to 10% by mass, particularly preferably 0.5 to 5% by mass, and most preferably 0.5 to less than 4% by mass. When the amount of the compound (b) to be added is less than 0.05% by mass, peeling traces may be generated, and when the amount is more than 20% by mass, also peeling traces may be generated.

Specific examples of the compound (b) include β-epoxypropyl(β-epithiopropyl)sulfide, β-epoxypropyl(β-epithiopropyl)disulfide, β-epoxypropylthio(β-epithiopropylthio) methane, 1-(β-epoxypropylthio)-2-(β-epithiopropylthio) ethane, 1-(β-epoxypropylthio)-3-(β-epithiopropylthio) propane and 1-(β-epoxypropylthio)-4-(β-epithiopropylthio) butane. As the compound (b), such compounds may be used solely, or two or more compounds may be used in combination.

Among the above-described compounds, β-epoxypropyl (β-epithiopropyl)sulfide (n=0 in formula (2)) and β-epoxypropyl(β-epithiopropyl)disulfide (m=0 and n=1 in formula (2)) are preferred, and β-epoxypropyl(β-epithiopropyl)sulfide (n=0 in formula (2)) is most preferred.

The compound of formula (1) and the compound of formula (2) can be obtained by reacting an epoxy compound represented by formula (3) below with thiourea:

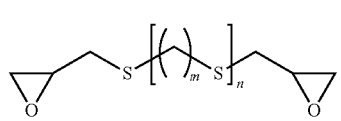

(3)

wherein m represents an integer from 0 to 4, and n represents an integer from 0 to 2.

Note that when obtaining the compound of formula (1) by reacting the epoxy compound represented by formula (3) with thiourea, stopping the reaction in mid-course is a technique for obtaining the mixture of the compound of formula (1) and the compound of formula (2) efficiently. Specifically, the reaction is performed in the presence of an acid, acid anhydride or ammonium salt in a mixed solvent of a polar organic solvent, which can dissolve thiourea, and a non-polar organic solvent, which can dissolve the epoxy compound represented by formula (3), and the reaction is terminated before it is completed. A method for obtaining the composition for optical materials of the present invention by mixing the mixture of the compound (a) and the compound (b) thus obtained with the polyisocyanate (c), the polythiol (d) and the sulfur (e) is a preferred embodiment of the present invention.

In the method for obtaining the compound of formula (1) and the compound of formula (2) by means of the reaction, thiourea is used in a mole number corresponding to epoxy of the epoxy compound represented by formula (3), i.e., a theoretical amount, but when importance is placed on the reaction rate and the purity, thiourea is used in the theoretical amount to 2.5 times the theoretical amount (mol). The amount is preferably from 1.3 times the theoretical amount (mol) to 2.0 times the theoretical amount (mol), and more preferably from 1.5 times the theoretical amount (mol) to 2.0 times the theoretical amount (mol). Examples of the polar organic solvent that can dissolve thiourea include alcohols such as methanol and ethanol, ethers such as diethyl ether, tetrahydrofuran and dioxane and hydroxy ethers such as methyl cellosolve, ethyl cellosolve and butyl cellosolve, and alcohols are preferred and methanol is most preferred. Examples of the non-polar organic solvent that can dissolve the epoxy compound represented by formula (3) include aliphatic hydrocarbons such as pentane, hexane and heptane, aromatic hydrocarbons such as benzene and toluene and halogenated hydrocarbons such as dichloromethane, chloroform and chlorobenzene, and aromatic hydrocarbons are preferred and toluene is most preferred. Regarding the solvent ratio, the volume ratio of the polar organic solvent/ the non-polar organic solvent=0.1 to 10.0, and preferably, the volume ratio of the polar organic solvent/the non-polar organic solvent=0.2 to 5.0. When the volume ratio is less than 0.1, thiourea is not sufficiently dissolved and the reaction does not proceed sufficiently, and when the volume ratio is more than 10.0, polymer formation becomes pronounced. The reaction temperature is 10° C. to 30° C. When the reaction temperature is lower than 10° C., not only the reaction rate is reduced, but also thiourea is not sufficiently dissolved and the reaction does not proceed sufficiently, and when the temperature is higher than 30° C., polymer formation becomes pronounced. Specific examples of the acid or acid anhydride to be used include: inorganic acidic compounds such as nitric acid, hydrochloric acid, perchloric acid, hypochlorous acid, chlorine dioxide, hydrofluoric acid, sulfuric acid, fuming sulfuric acid, sulfuryl chloride, boric acid, arsenic acid, arsenious acid, pyroarsenic acid, phosphoric acid, phosphorous acid, hypophosphoric acid, phosphorus oxychloride, phosphorous oxybromide, phosphorus sulfide, phosphorus trichloride, phosphorus tribromide, phosphorus pentachloride, hydrocyanic acid, chromic acid, nitric anhydride, sulphuric anhydride, boron oxide, arsenic pentoxide, phosphorus pentoxide, chromic anhydride, silica gel, silica alumina, aluminium chloride and zinc chloride; organic carboxylic acids such as formic acid, acetic acid, peracetic acid, thioacetic acid, oxalic acid, tartaric acid, propionic acid, butyric acid, succinic acid, valeric acid, caproic acid, caprylic acid, naphthenic acid, methyl mercaptopropionate, malonic acid, glutaric acid, adipic acid, cyclohexanecarboxylic acid, thiodipropionic acid, dithiodipropionic acid, maleic acid, benzoic acid, phenylacetic acid, o-toluic acid, m-toluic acid, p-toluic acid, salicylic acid, 2-methoxybenzoic acid, 3-methoxybenzoic acid, benzoylbenzoic acid, phthalic acid, isophthalic acid, terephthalic acid, salicylic acid, benzilic acid, α-naphthalenecarboxylic acid, P-naphthalenecarboxylic acid, acetic anhydride, propionic anhydride, butyric anhydride, succinic anhydride, maleic anhydride, benzoic anhydride, phthalic anhydride, pyromellitic dianhydride, trimellitic anhydride and trifluoroacetic anhydride; phosphoric acids such as mono-, di- or trimethyl phosphate, mono-, di- or triethyl phosphate, mono-, di- or triisobutyl phosphate, mono-, di- or tributyl phosphate and mono-, di- or trilauryl phosphate, and phosphorous acids in which the phosphate moiety of any of the phosphoric acids is changed to a phosphite; organic phosphorous compounds such as dialkyl phosphorodithioates typified by dimethyl phosphorodithioate; phenols such as phenol, catechol, t-butyl catechol, 2,6-di-t-butyl cresol, 2,6-di-t-butyl ethylphenol, resorcin, hydroquinone, phloroglucin, pyrogallol, cresol, ethyl phenol, butyl phenol, nonyl phenol, hydroxyphenylacetic acid, hydroxyphenylpropionic acid, hydroxyphenylacetamide, methyl hydroxyphenylacetate, ethyl hydroxyphenylacetate, hydroxyphenethyl alcohol, hydroxyphenethyl amine, hydroxybenzaldehyde, phenylphenol, bisphenol A, 2,2'-methylene-bis(4-methyl-6-t-butyl phenol), bisphenol F, bisphenol S, α-naphthol, β-naphthol, aminophenol, chlorophenol and 2,4,6-trichlorophenol; and sulfonic acids such as methanesulfonic acid, ethanesulfonic acid, butanesulfonic acid, dodecanesulfonic acid, benzenesulfonic acid, o-toluenesulfonic acid, m-toluenesulfonic acid, p-toluenesulfonic acid, ethylbenzenesulfonic acid, butylbenzenesulfonic acid, dodecylbenzenesulfonic acid, p-phenolsulfonic acid, o-cresolsulfonic acid, metanilic acid, sulfanilic acid, 4B-acid, diaminostilbenesulfonic acid, biphenylsulfonic acid, α-naphthalenesulfonic acid, β-naphthalenesulfonic acid, peri acid, Laurent's acid and phenyl-J-acid. Several of them may be used in combination. Preferred are organic carboxylic acids such as formic acid, acetic acid, peracetic acid, thioacetic acid, oxalic acid, tartaric acid, propionic acid, butyric acid, succinic acid, valeric acid, caproic acid, caprylic acid, naphthenic acid, methyl mercaptopropionate, malonic acid, glutaric acid, adipic acid, cyclohexanecarboxylic acid, thiodipropionic acid, dithiodipropionic acid, maleic acid, benzoic acid, phenylacetic acid, o-toluic acid, m-toluic acid, p-toluic acid, salicylic acid, 2-methoxybenzoic acid, 3-methoxybenzoic acid, benzoylbenzoic acid, phthalic acid, isophthalic acid, terephthalic acid, salicylic acid, benzilic acid, α-naphthalenecarboxylic acid, β-naphthalenecarboxylic acid, acetic anhydride, propionic anhydride, butyric anhydride, succinic anhydride, maleic anhydride, benzoic anhydride, phthalic anhydride, pyromellitic dianhydride, trimellitic anhydride and trifluoroacetic anhydride. More preferred are acid anhydrides such as acetic anhydride, propionic anhydride, butyric anhydride, succinic anhydride, maleic anhydride, benzoic anhydride, phthalic anhydride, pyromellitic dianhydride, trimellitic anhydride and trifluoroacetic anhydride. Acetic anhydride is most preferred. The amount to be added is usually 0.001 to 10% by mass, and preferably 0.01 to 5% by mass relative to the total amount of the reaction solution. When the amount to be added is less than 0.001% by mass, polymer formation becomes pronounced, resulting in reduction in the yield of the reaction, and when the amount is more than 10% by mass, the yield is significantly reduced.

Specific examples of the ammonium salt include ammonium chloride, ammonium bromide, ammonium iodide, ammonium formate, ammonium acetate, propionic acid ammonium, ammonium benzoate, ammonium sulfate, ammonium nitrate, ammonium carbonate, ammonium phosphate and ammonium hydroxide. Ammonium nitrate, ammonium sulfate and ammonium chloride are more preferred, and ammonium nitrate is most preferred.

The reaction thereof is monitored by NMR, IR, liquid chromatograph or gas chromatograph, and the reaction is terminated in the state where the compound having the structure represented by formula (2) remains. The reaction is terminated in the state where the compound having the structure represented by formula (2) remains preferably in an amount of 0.05 to 20% by mass, more preferably in an amount of 0.1 to 15% by mass, particularly preferably in an amount of 0.5 to 10% by mass, and most preferably in an amount of 0.5 to less than 4% by mass.

When the total amount of the compounds (a) to (d) (compounds (a) to (e) when the sulfur (e) is contained) is 100% by mass, the amount of the polyisocyanate (c) to be added in the present invention is usually 1 to 25% by mass, preferably 2 to 25% by mass, and particularly preferably 5 to 20% by mass. When the amount of the polyisocyanate (c) to be added is less than 1% by mass, the strength may be reduced, and when the amount is more than 25% by mass, the color tone may be reduced. As the polyisocyanate (c) to be used in the present invention, a compound may be used solely, or two or more compounds may be used in combination.

Specific examples thereof include diethylene diisocyanate, tetramethylene diisocyanate, hexamethylene diisocyanate, trimethylhexamethylene diisocyanate, cyclohexane diisocyanate, 1,3-bis(isocyanatemethyl)cyclohexane, 1,4-bis(isocyanatemethyl)cyclohexane, isophorone diisocyanate, 2,6-bis(isocyanatemethyl)decahydronaphthalene, lysine triisocyanate, tolylene diisocyanate, o-tolidine diisocyanate, diphenylmethane diisocyanate, diphenylether diisocyanate, 3-(2'-isocyanatecyclohexyl)propylisocyanate, isopropylidene bis(cyclohexyl isocyanate), 2,2'-bis(4-isocyanatephenyl)propane, triphenylmethane triisocyanate, bis(diisocyanatetolyl)phenylmethane, 4,4',4"-triisocyanate-2,5-dimethoxyphenylamine, 3,3'-dimethoxybenzidine-4,4'-diisocyanate, 1,3-phenylene diisocyanate, 1,4-phenylene diisocyanate, 4,4'-diisocyanatebiphenyl, 4,4'-diisocyanate-3,3'-dimethylbiphenyl, dicyclohexylmethane-4,4'-diisocyanate, 1,1'-methylenebis(4-isocyanatebenzene), 1,1'-methylenebis(3-methyl-4-isocyanatebenzene), m-xylylene diisocyanate, p-xylylene diisocyanate, m-tetramethyl xylylene diisocyanate, p-tetramethyl xylylene diisocyanate, 1,3-bis(2-isocyanate-2-propyl)benzene, 2,6-bis(isocyanatemethyl)naphthalene, 1,5-naphthalene diisocyanate, bis(isocyanatemethyl)tetrahydrodicyclopentadiene, bis(isocyanatemethyl)dicyclopentadiene, bis(isocyanatemethyl) tetrahydrothiophene, bis(isocyanatemethyl)norbornene, bis(isocyanatemethyl)adamantane, thiodiethyl diisocyanate, thiodipropyl diisocyanate, thiodihexyl diisocyanate, bis[(4-isocyanatemethyl)phenyl]sulfide, 2,5-diisocyanate-1,4-dithiane, 2,5-diisocyanatemethyl-1,4-dithiane, 2,5-diisocyanatemethylthiophene, dithiodiethyl diisocyanate and dithiodipropyl diisocyanate.

However, the polyisocyanate (c) to be used in the present invention is not limited thereto, and these substances may be used solely, or two or more of them may be used in combination.

Among them, at least one compound selected from isophorone diisocyanate, tolylene diisocyanate, diphenylmethane diisocyanate, hexamethylene diisocyanate, m-xylylene diisocyanate, p-xylylene diisocyanate, m-tetramethyl xylylene diisocyanate, p-tetramethyl xylylene diisocyanate, 1,3-bis(isocyanatemethyl)cyclohexane, 1,4-bis(isocyanatemethyl)cyclohexane, bis(isocyanatemethyl)norbornene and 2,5-diisocyanatemethyl-1,4-dithiane is a preferred specific example. Isophorone diisocyanate, tolylene diisocyanate, diphenylmethane diisocyanate, hexamethylene diisocyanate, 1,3-bis(isocyanatemethyl)cyclohexane and m-xylylene diisocyanate are particularly preferred, and isophorone diisocyanate, m-xylylene diisocyanate and 1,3-bis(isocyanatemethyl)cyclohexane are most preferred.

When the total amount of the compounds (a) to (d) (compounds (a) to (e) when the sulfur (e) is contained) is 100% by mass, the amount of the polythiol (d) to be added in the present invention is usually 1 to 25% by mass, preferably 2 to 25% by mass, and particularly preferably 5 to 20% by mass. When the amount of the polythiol (d) to be added is less than 1% by mass, the oxidation resistance may be reduced, and when the amount is more than 25% by mass, the heat resistance may be reduced. As the polythiol (d) to be used in the present invention, compounds may be used solely, or two or more of them may be used in combination.

Specific examples thereof include methanedithiol, methanetrithiol, 1,2-dimercaptoethane, 1,2-dimercaptopropane, 1,3-dimercaptopropane, 2,2-dimercaptopropane, 1,4-dimercaptobutane, 1,6-dimercaptohexane, bis(2-mercaptoethyl)ether, bis(2-mercaptoethyl)sulfide, 1,2-bis(2-mercaptoethyloxy)ethane, 1,2-bis(2-mercaptoethylthio)ethane, 2,3-dimercapto-1-propanol, 1,3-dimercapto-2-propanol, 1,2,3-trimercaptopropane, 2-mercaptomethyl-1,3-dimercaptopropane, 2-mercaptomethyl-1,4-dimercaptobutane, 2-(2-mercaptoethylthio)-1,3-dimercaptopropane, 4-mercaptomethyl-1,8-dimercapto-3,6-dithiaoctane, 2,4-dimercaptomethyl-1,5-dimercapto-3-thiapentane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,1-tris(mercaptomethyl)propane, tetrakis(mercaptomethyl)methane, ethyleneglycol bis(2-mercaptoacetate), ethyleneglycol bis(3-mercaptopropionate), diethyleneglycol bis(2-mercaptoacetate), diethyleneglycol bis(3-mercaptopropionate), 1,4-butanediol bis(2-mercaptoacetate), 1,4-butanediol bis(3-mercaptopropionate), trimethylolpropane tris(thioglycolate), trimethylolpropane tris(mercapto propionate), pentaerythritol tetrakis-thioglycolate, pentaerythritol tetrakis-mercaptopropionate, 1,2-dimercaptocyclohexane, 1,3-dimercaptocyclohexane, 1,4-dimercaptocyclohexane, 1,3-bis(mercaptomethyl)cyclohexane, 1,4-bis(mercaptomethyl)cyclohexane, 2,5-dimercaptomethyl-1,4-dithiane, 2,5-dimercaptomethyl-1,4-dithiane, 2,5-bis(2-mercaptoethylthiomethyl)-1,4-dithiane, 2,5-dimercaptomethyl-1-thiane, 2,5-dimercaptoethyl-1-thiane, 2,5-dimercaptomethylthiophene, 1,2-dimercaptobenzene, 1,3-dimercaptobenzene, 1,4-dimercaptobenzene, 1,3-bis(mercaptomethyl)benzene, 1,4-bis(mercaptomethyl)benzene, 2,2'-dimercaptobiphenyl, 4,4'-dimercaptobiphenyl, bis(4-mercaptophenyl)methane, 2,2-bis(4-mercaptophenyl)propane, bis(4-mercaptophenyl)ether, bis(4-mercaptophenyl)sulfide, bis(4-mercaptophenyl)sulfone, bis(4-mercaptomethylphenyl)methane, 2,2-bis(4-mercaptomethylphenyl)propane, bis(4-mercaptomethylphenyl)ether, bis(4-mercaptomethylphenyl)sulfide, 2,5-dimercapto-1,3,4-thiadiazole, 3,4-thiophenedithiol and 1,1,3,3-tetrakis(mercaptomethylthio)propane.

Among them, bis(2-mercaptoethyl)sulfide, 2,5-dimercaptomethyl-1,4-dithiane, 1,3-bis(mercaptomethyl)benzene, 1,4-bis(mercaptomethyl)benzene, 4-mercaptomethyl-1,8-dimercapto-3,6-dithiaoctane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,3,3-tetrakis(mercaptomethylthio)propane, pentaerythritol tetrakis-mercaptopropionate, pentaerythritol tetrakis-thioglycolate, trimethylolpropane tris(thioglycolate) and trimethylolpropane tris(mercapto propionate) are preferred, bis(2-mercaptoethyl)sulfide, 2,5-bis(2-mercaptomethyl)-1,4-dithiane, 4-mercaptomethyl-1,8-dimercapto-3,6-dithiaoctane, 1,3-bis(mercaptomethyl)benzene, pentaerythritol tetrakis-mercaptopropionate and pentaerythritol tetrakis-thioglycolate are more preferred, and bis(2-mercaptoethyl)sulfide, 2,5-dimercaptomethyl-1,4-dithiane and 4-mercaptomethyl-1,8-dimercapto-3,6-dithiaoctane are most preferred.

Further, the ratio of the SH groups in the polythiol (d) to the NCO groups in the polyisocyanate (c), i.e., [the number of the SH groups in the polythiol (d)/the number of the NCO groups in the polyisocyanate (c)](SH group/NCO group) is preferably 1.0 to 2.5, more preferably 1.25 to 2.25, and even more preferably 1.5 to 2.0. When the above-described ratio is less than 1.0, a cured product may turn yellow, and when the ratio is more than 2.5, the heat resistance may be reduced.

When the total amount of the compounds (a) to (e) is 100% by mass, the amount of the sulfur (e), which is preferably used in the present invention, to be added is usually 0.1 to 15% by mass, preferably 0.2 to 10% by mass, and particularly preferably 0.3 to 5% by mass.

The sulfur to be used in the present invention may be in any form. Specifically, the sulfur is finely-powdered sulfur, colloidal sulfur, precipitated sulfur, crystalline sulfur, sublimed sulfur or the like, and is preferably finely-powdered sulfur having fine particles.

The sulfur to be used in the present invention may be produced by any production method. Examples of methods for producing sulfur include methods of sublimation and purification from natural sulfur ores, methods of mining underground sulfur by means of the melting method, and methods of recovery using, for example, hydrogen sulfide obtained in the process of desulfurization of petroleum oil, natural gas or the like, as a raw material, but any of these production methods may be employed.

It is preferred that the particle size of the sulfur to be used in the present invention is less than 10 mesh, that is, the sulfur is in the form of fine powder having a particle size of less than 10 mesh. When the particle size of the sulfur is more than 10 mesh, it is difficult to dissolve the sulfur completely. For this reason, an undesirable reaction or the like may be caused in the first step to generate a defect. The particle size of the sulfur is more preferably less than 30 mesh, and most preferably less than 60 mesh.

The purity of the sulfur to be used in the present invention is preferably at least 98%, more preferably at least 99.0%, even more preferably at least 99.5%, and most preferably at least 99.9%. When the purity of the sulfur is at least 98%, the color tone of the obtained optical material is improved compared to the case of lower than 98%.

When obtaining an optical material by polymerizing and curing the composition for optical materials of the present invention, it is preferred to add a polymerization catalyst to the compound (a), the compound (b), the polyisocyanate (c) and the polythiol (d). Moreover, when obtaining an optical material by polymerizing and curing the composition for optical materials of the present invention, it is preferred to add a polymerization catalyst to the compound (a), the compound (b), the polyisocyanate (c), the polythiol (d) and the sulfur (e). As the polymerization catalyst, onium salts, in particular, quaternary ammonium salts, quaternary phosphonium salts, tertiary sulfonium salts and secondary iodonium salts are preferred. Among them, quaternary ammonium salts and quaternary phosphonium salts, which have good compatibility with the resin composition for optical materials, are more preferred, and quaternary phosphonium salts are even more preferred. More preferred examples of the polymerization catalyst include quaternary ammonium salts such as tetra-n-butylammonium bromide, triethylbenzyl ammonium chloride, cetyldimethylbenzyl ammonium chloride and 1-n-dodecyl pyridinium chloride and quaternary phosphonium salts such as tetra-n-butylphosphonium bromide and tetraphenyl phosphonium bromide. Among them, tetra-n-butylammonium bromide, triethylbenzyl ammonium chloride and tetra-n-butylphosphonium bromide are even more preferred polymerization catalysts, and tetra-n-butylphosphonium bromide is the most preferred polymerization catalyst.

The amount of the polymerization catalyst to be added cannot be determined categorically because it varies depending on the components of the composition, the mixing ratio and the method for polymerization and curing, but the amount is usually 0.0001% by mass to 10% by mass, preferably 0.001% by mass to 5% by mass, more preferably 0.01% by mass to 1% by mass, and most preferably 0.01% by mass to 0.5% by mass when the total amount of the compounds (a) to (d) (compounds (a) to (e) when the sulfur (e) is contained) is 100% by mass. When the amount of the polymerization catalyst to be added is more than 10% by mass, the composition may be rapidly polymerized and colored. When the amount of the polymerization catalyst to be added is less than 0.0001% by mass, the resin composition for optical materials may be insufficiently cured, resulting in poor heat resistance.

Moreover, in the production of the optical material according to the production method of the present invention, it is surely possible to add publicly-known additives such as an antioxidant, an ultraviolet absorber, a yellowing inhibitor, a blueing agent and a pigment to the compounds (a) to (d) (compounds (a) to (e) when the sulfur (e) is contained) to further improve practicability of the optical material obtained.

Preferred examples of the antioxidant include phenol derivatives. Among them, polyhydric phenols and halogen-substituted phenols are preferred compounds, and catechol, pyrogallol and alkyl-substituted catechols are more preferred compounds, and catechol is the most preferred compound.

Preferred examples of the ultraviolet absorber include benzotriazole-based compounds, and 2-(2-hydroxy-5-methylphenyl)-2H-benzotriazol, 5-chloro-2-(3,5-di-tert-butyl-2-hydroxyphenyl)-2H-benzotriazol, 2-(2-hydroxy-4-octylphenyl)-2H-benzotriazol, 2-(2-hydroxy-4-methoxyphenyl)-2H-benzotriazol, 2-(2-hydroxy-4-ethoxyphenyl)-2H-benzotriazol, 2-(2-hydroxy-4-butoxyphenyl)-2H-benzotriazol, 2-(2-hydroxy-4-octyloxyphenyl)-2H-benzotriazol and 2-(2-hydroxy-5-t-octylphenyl)-2H-benzotriazol are particularly preferred compounds.

The amount of each of the antioxidant and the ultraviolet absorber to be added is usually 0.01 to 5% by mass when the total amount of the compounds (a) to (d) (compounds (a) to (e) when the sulfur (e) is contained) is 100% by mass.

When polymerizing and curing the resin composition for optical materials, for the purpose of extension of the pot life, dispersion of heat generated by polymerization, etc., a polymerization modifier may be added to the compounds (a) to (d) (compounds (a) to (e) when the sulfur (e) is contained) according to need. Examples of the polymerization modifier include halides of groups 13 to 16 of the long form of the periodic table. Among them, halides of silicon, germanium, tin and antimony are preferred, and chlorides of germanium, tin and antimony, which have an alkyl group, are more preferred. Further, dibutyltin dichloride, butyltin trichloride, dioctyltin dichloride, octyltin trichloride, dibutyldichlorogermanium, butyltrichlorogermanium, diphenyldichlorogermanium, phenyltrichlorogermanium and triphenylantimony dichloride are even more preferred, and dibutyltin dichloride is the most preferred compound. These polymerization modifiers may be used solely, or two or more of them may be used in combination.

The amount of the polymerization modifier to be added is 0.0001 to 5.0% by mass, preferably 0.0005 to 3.0% by mass, and more preferably 0.001 to 2.0% by mass when the total amount of the compounds (a) to (d) (compounds (a) to (e) when the sulfur (e) is contained) is 100% by mass. When the amount of the polymerization modifier to be added is less than 0.0001% by mass, sufficient pot life cannot be ensured in the obtained optical material, and when the amount of the polymerization modifier to be added is more than 5.0% by mass, the resin composition for optical materials may not be sufficiently cured, and the heat resistance of the obtained optical material may be reduced.

The resin composition for optical materials thus obtained is injected into a mold or the like and polymerized to obtain an optical material.

At the time of cast-molding the resin composition for optical materials of the present invention, it is preferred to filter and remove impurities using, for example, a filter having a pore diameter of about 0.1 to 5 m in terms of improving the quality of the optical material of the present invention.

The resin composition for optical materials of the present invention is usually polymerized as described below. Specifically, the curing time is usually 1 to 100 hours, and the curing temperature is usually −10° C. to 140° C. The polymerization is conducted by carrying out a step of retaining the composition at a predetermined polymerization temperature for a predetermined amount of time, a step of increasing the temperature at a rate of 0.1° C. to 100° C./h and a step of decreasing the temperature at a rate of 0.1° C. to 100° C./h, or a combination of these steps.

Further, it is preferred to anneal the obtained optical material at a temperature of 50 to 150° C. for about 10 minutes to 5 hours after curing is completed in terms of eliminating distortion of the optical material of the present invention. Moreover, the obtained optical material may be subjected to a surface treatment such as dyeing, hard coating, impact-resistant coating, antireflection treatment and imparting antifog properties according to need.

EXAMPLES

Hereinafter, the present invention will be specifically described by way of working examples and comparative examples. However, the present invention is not limited to the below-described working examples.

The defect where peeling traces are left on each of optical materials obtained by methods of the below-described working examples and comparative examples was evaluated in a manner described below.

A resin composition for an optical material was injected into a lens mold composed of two glass plates and a tape, and it was heated at 30° C. for 30 hours, then the temperature was elevated to 100° C. over 10 hours at a constant rate, and finally, the composition was heated at 100° C. for 1 hour to be polymerized and cured. After cooling, the obtained product was released from the mold and annealed at 110° C. for 60 minutes, and after that, the surface condition thereof was visually observed. 10 products were produced, and the case where no peeling trace was left on every product was rated as "A", the case where peeling traces were left on 1 product was rated as "B", the case where peeling traces were left on 2 products was rated as "C", and the case where peeling traces were left on 3 or more products was rated as "D". A, B and C are regarded as acceptable, but A and B are preferred, and A is particularly preferred.

Example 1

To (a) 1319 g of bis(β-epithiopropyl)sulfide (hereinafter referred to as "the compound (a-1)"), (b) 1 g of P-epoxypropyl(β-epithiopropyl)sulfide (hereinafter referred to as "the compound (b-1)"), (c) 340 g of isophorone diisocyanate (hereinafter referred to as "the compound (c-1)") and (d) 340 g of bis(2-mercaptoethyl)sulfide (hereinafter referred to as "the compound (d-1)"), 20 g of 2-(2-hydroxy-5-t-octylphenyl)-2H-benzotriazole as an ultraviolet absorber, 0.2 g of Zelec UN (manufactured by Stepan) as a mold release agent and 2 g of tetra-n-butylphosphonium bromide as a polymerization catalyst were added, and the mixture was well mixed homogeneously at 20° C. After that, the obtained mixture was subjected to the deaeration treatment at a vacuum degree of 4 kPa, and the resin composition for an optical material was injected into (1) a mold for a semi-finished lens having a mold diameter of 75 mm, a central thickness of 7 mm and an edge thickness of 15 mm and (2) a mold for a minus lens having a mold diameter of 75 mm, a central thickness of 1 mm and an edge thickness of 10 mm, each of which was composed of two glass plates and a tape, and each of them was heated at 30° C. for 30 hours, then the temperature was elevated to 100° C. over 10 hours at a constant rate, and finally, each of them was heated at 100° C. for 1 hour to be polymerized and cured. After cooling, the obtained products were released from the molds and annealed at 110° C. for 60 minutes, and after that, the surface condition thereof was visually observed. The result regarding peeling traces on the obtained optical materials is shown in Table 1.

Example 2

The process was carried out in a manner similar to that in Example 1, except that (a) 1306 g of the compound (a-1) and (b) 14 g of the compound (b-1) were used.

The result regarding peeling traces on the obtained optical materials is shown in Table 1.

Example 3

The process was carried out in a manner similar to that in Example 1, except that (a) 1280 g of the compound (a-1) and (b) 40 g of the compound (b-1) were used. The result regarding peeling traces on the obtained optical materials is shown in Table 1.

Example 4

The process was carried out in a manner similar to that in Example 1, except that (a) 1240 g of the compound (a-1) and (b) 80 g of the compound (b-1) were used. The result regarding peeling traces on the obtained optical materials is shown in Table 1.

Example 5

The process was carried out in a manner similar to that in Example 1, except that (a) 1200 g of the compound (a-1) and (b) 120 g of the compound (b-1) were used. The result regarding peeling traces on the obtained optical materials is shown in Table 1.

Example 6

The process was carried out in a manner similar to that in Example 1, except that (a) 1100 g of the compound (a-1) and (b) 220 g of the compound (b-1) were used. The result regarding peeling traces on the obtained optical materials is shown in Table 1.

Comparative Example 1

The process was carried out in a manner similar to that in Example 1, except that (a) 1320 g of the compound (a-1), (c) 340 g of the compound (c-1) and (d) 340 g of the compound (d-1) were used without addition of the compound (b). The result regarding peeling traces on the obtained optical materials is shown in Table 1. Since the compound (b) was not used, peeling traces were generated.

TABLE 1

| Examples Comparative Examples | Composition (% by mass) | | | | SH/ NCO ratio | Peeling traces Mold (1) | Peeling traces Mold (2) |
| --- | --- | --- | --- | --- | --- | --- | --- |
| | a-1 | b-1 | c-1 | d-1 | | | |
| Example 1 | 65.95 | 0.05 | 17.00 | 17.00 | 1.44 | B | B |
| Example 2 | 65.30 | 0.70 | 17.00 | 17.00 | 1.44 | A | A |
| Example 3 | 64.00 | 2.00 | 17.00 | 17.00 | 1.44 | A | A |
| Example 4 | 62.00 | 4.00 | 17.00 | 17.00 | 1.44 | A | A |
| Example 5 | 60.00 | 6.00 | 17.00 | 17.00 | 1.44 | A | B |
| Example 6 | 55.00 | 11.00 | 17.00 | 17.00 | 1.44 | B | C |
| Comparative Example 1 | 66.00 | 0 | 17.00 | 17.00 | 1.44 | D | D |

Example 7

To (a) 1399 g of the compound (a-1), (b) 1 g of the compound (b-1), (c) 240 g of 1,3-bis(isocyanatemethyl)cyclohexane (hereinafter referred to as "the compound (c-2)") and (d) 360 g of 4-mercaptomethyl-1,8-dimercapto-3,6-dithiaoctane (hereinafter referred to as "the compound (d-2)"), 20 g of 2-(2-hydroxy-5-t-octylphenyl)-2H-benzotriazole as an ultraviolet absorber, 0.2 g of Zelec UN (manufactured by Stepan) as a mold release agent and 2 g of tetra-n-butylphosphonium bromide as a polymerization catalyst were added, and the mixture was well mixed homogeneously at 20° C. After that, the obtained mixture was subjected to the deaeration treatment at a vacuum degree of 4 kPa, and the resin composition for an optical material was injected into (1) a mold for a semi-finished lens having a mold diameter of 75 mm, a central thickness of 7 mm and an edge thickness of 15 mm and (2) a mold for a minus lens having a mold diameter of 75 mm, a central thickness of 1 mm and an edge thickness of 10 mm, each of which was composed of two glass plates and a tape, and each of them was heated at 30° C. for 30 hours, then the temperature was elevated to 100° C. over 10 hours at a constant rate, and finally, each of them was heated at 100° C. for 1 hour to be polymerized and cured. After cooling, the obtained products were released from the molds and annealed at 110° C. for 60 minutes, and after that, the surface condition thereof was visually observed. The result regarding peeling traces on the obtained optical materials is shown in Table 2.

Example 8

The process was carried out in a manner similar to that in Example 7, except that (a) 1390 g of the compound (a-1) and (b) 10 g of the compound (b-1) were used. The result regarding peeling traces on the obtained optical materials is shown in Table 2.

Example 9

The process was carried out in a manner similar to that in Example 7, except that (a) 1360 g of the compound (a-1) and (b) 40 g of the compound (b-1) were used. The result regarding peeling traces on the obtained optical materials is shown in Table 2.

Example 10

The process was carried out in a manner similar to that in Example 7, except that (a) 1320 g of the compound (a-1) and (b) 80 g of the compound (b-1) were used. The result regarding peeling traces on the obtained optical materials is shown in Table 2.

Example 11

The process was carried out in a manner similar to that in Example 7, except that (a) 1280 g of the compound (a-1) and (b) 120 g of the compound (b-1) were used. The result regarding peeling traces on the obtained optical materials is shown in Table 2.

Example 12

The process was carried out in a manner similar to that in Example 7, except that (a) 1080 g of the compound (a-1) and (b) 320 g of the compound (b-1) were used. The result regarding peeling traces on the obtained optical materials is shown in Table 2.

Comparative Example 2

The process was carried out in a manner similar to that in Example 7, except that (a) 1400 g of the compound (a-1), (c) 240 g of the compound (c-2) and (d) 360 g of the compound (d-2) were used without addition of the compound (b). The result regarding peeling traces on the obtained optical materials is shown in Table 2. Since the compound (b) was not used, peeling traces were generated.

TABLE 2

| Examples Comparative Examples | Composition (% by mass) | | | | SH/ NCO ratio | Peeling traces Mold (1) | Peeling traces Mold (2) |
|---|---|---|---|---|---|---|---|
| | a-1 | b-1 | c-2 | d-2 | | | |
| Example 7 | 69.95 | 0.05 | 12.00 | 18.00 | 1.68 | B | B |
| Example 8 | 69.50 | 0.50 | 12.00 | 18.00 | 1.68 | A | A |
| Example 9 | 68.00 | 2.00 | 12.00 | 18.00 | 1.68 | A | A |
| Example 10 | 66.00 | 4.00 | 12.00 | 18.00 | 1.68 | A | A |
| Example 11 | 64.00 | 6.00 | 12.00 | 18.00 | 1.68 | A | B |
| Example 12 | 54.00 | 16.00 | 12.00 | 18.00 | 1.68 | C | C |
| Comparative Example 2 | 70.00 | 0 | 12.00 | 18.00 | 1.68 | D | D |

Example 13

1464 g (10 mol) of bis(β-epoxypropyl)sulfide, 3048 g (40 mol) of thiourea and 120 g (1.2 mol) of acetic anhydride were fed together with 10 L of toluene and 10 L of methanol as solvents, the mixture was reacted at 20° C. for 5 hours and washed with 10% aqueous solution of sulfuric acid before the reaction was completed, and then the mixture was washed with water and the solvents were distilled away. The obtained compound was in an amount of 1520 g, and when it was analyzed by liquid chromatograph, it was a mixture in which the compound (a-1):the compound (b-1)=93:7.

The process was carried out in a manner similar to that in Example 1 using 1320 g of the mixture, (c) 340 g of the compound (c-1) and (d) 340 g of the compound (d-1). The result regarding peeling traces on the obtained optical materials is shown in Table 3.

Example 14

1464 g (10 mol) of bis(β-epoxypropyl)sulfide, 3048 g (40 mol) of thiourea and 120 g (1.2 mol) of acetic anhydride were fed together with 10 L of toluene and 10 L of methanol as solvents, the mixture was reacted at 22° C. for 7 hours and washed with 10% aqueous solution of sulfuric acid before the reaction was completed, and then the mixture was washed with water and the solvents were distilled away. The obtained compound was in an amount of 1520 g, and when it was analyzed by liquid chromatograph, it was a mixture in which the compound (a-1):the compound (b-1)=98:2.

The process was carried out in a manner similar to that in Example 1 using 1320 g of the mixture, (c) 340 g of the compound (c-1) and (d) 340 g of the compound (d-1). The result regarding peeling traces on the obtained optical materials is shown in Table 3.

Comparative Example 3

1464 g (10 mol) of bis(β-epoxypropyl)sulfide, 3048 g (40 mol) of thiourea and 120 g (1.2 mol) of acetic anhydride were fed together with 10 L of toluene and 10 L of methanol as solvents, the mixture was reacted at 30° C. for 10 hours and washed with 10% aqueous solution of sulfuric acid after the reaction was completed, and then the mixture was washed with water and the solvents were distilled away. The obtained compound was in an amount of 1515 g, and when it was analyzed by liquid chromatograph, it was the compound (a-1), and the compound (b-1) was not detected.

The process was carried out in a manner similar to that in Example 1 using 1320 g of the obtained compound (a-1), (c) 340 g of the compound (c-1) and 340 g of the compound (d-1). The result regarding peeling traces on the obtained optical materials is shown in Table 3.

TABLE 3

| Examples Comparative Examples | Composition (% by mass) | | | | SH/ NCO ratio | Peeling traces Mold (1) | Peeling traces Mold (2) |
|---|---|---|---|---|---|---|---|
| | a-1 | b-1 | c-1 | d-1 | | | |
| Example 13 | 61.38 | 4.62 | 17.00 | 17.00 | 1.44 | A | A |
| Example 14 | 64.68 | 1.32 | 17.00 | 17.00 | 1.44 | A | A |
| Comparative Example 3 | 66.00 | 0 | 17.00 | 17.00 | 1.44 | D | D |

Example 15

To (a) 1579 g of the compound (a-1), (b) 1 g of the compound (b-1), (c) 142 g of m-xylylene diisocyanate (hereinafter referred to as "the compound (c-3)"), (d) 132 g of pentaerythritol tetrakis-mercaptopropionate (hereinafter referred to as "the compound (d-3)") and 136 g of the compound (d-1) and (e) 5 g of sulfur (hereinafter referred to as "the compound (e-1)"), 20 g of 2-(2-hydroxy-5-t-octylphenyl)-2H-benzotriazole as an ultraviolet absorber, 0.2 g of Zelec UN (manufactured by Stepan) as a mold release agent, 2 g of tetra-n-butylphosphonium bromide as a polymerization catalyst and 0.2 g of dibutyltin dichloride as a polymerization modifier were added, and the mixture was well mixed homogeneously at 20° C. After that, the obtained mixture was subjected to the deaeration treatment at a vacuum degree of 1.3 kPa, and the resin composition for an optical material was injected into (1) a mold for a semifinished lens having a mold diameter of 75 mm, a central thickness of 7 mm and an edge thickness of 15 mm and (2) a mold for a minus lens having a mold diameter of 75 mm, a central thickness of 1 mm and an edge thickness of 10 mm, each of which was composed of two glass plates and a tape, and each of them was heated at 30° C. for 30 hours, then the temperature was elevated to 100° C. over 10 hours at a constant rate, and finally, each of them was heated at 100° C. for 1 hour to be polymerized and cured. After cooling, the obtained products were released from the molds and annealed at 110° C. for 60 minutes, and after that, the surface condition thereof was visually observed. The result regarding peeling traces on the obtained optical materials is shown in Table 4.

Example 16

The process was carried out in a manner similar to that in Example 15, except that (a) 1566 g of the compound (a-1) and (b) 14 g of the compound (b-1) were used.
The result regarding peeling traces on the obtained optical materials is shown in Table 4.

Example 17

The process was carried out in a manner similar to that in Example 15, except that (a) 1540 g of the compound (a-1) and (b) 40 g of the compound (b-1) were used. The result regarding peeling traces on the obtained optical materials is shown in Table 4.

Example 18

The process was carried out in a manner similar to that in Example 15, except that (a) 1500 g of the compound (a-1) and (b) 80 g of the compound (b-1) were used. The result regarding peeling traces on the obtained optical materials is shown in Table 4.

Example 19

The process was carried out in a manner similar to that in Example 15, except that (a) 1420 g of the compound (a-1) and (b) 160 g of the compound (b-1) were used. The result regarding peeling traces on the obtained optical materials is shown in Table 4.

Example 20

The process was carried out in a manner similar to that in Example 15, except that (a) 1360 g of the compound (a-1) and (b) 220 g of the compound (b-1) were used. The result regarding peeling traces on the obtained optical materials is shown in Table 4.

Comparative Example 4

The process was carried out in a manner similar to that in Example 15, except that (a) 1580 g of the compound (a-1), (c) 142 g of the compound (c-3), (d) 132 g of the compound (d-3) and 136 g of the compound (d-1) and (e) 10 g of the compound (e-1) were used without addition of the compound (b). The result regarding peeling traces on the obtained optical materials is shown in Table 4. Since the compound (b) was not used, peeling traces were generated.

TABLE 4

| Examples Comparative Examples | Composition (% by mass) | | | | | | SH/ NCO ratio | Peeling traces Mold (1) | Peeling traces Mold (2) |
|---|---|---|---|---|---|---|---|---|---|
| | a-1 | b-1 | c-3 | d-3 | d-1 | e-1 | | | |
| Example 15 | 78.95 | 0.05 | 7.10 | 6.60 | 6.80 | 0.50 | 1.88 | B | B |
| Example 16 | 78.30 | 0.70 | 7.10 | 6.60 | 6.80 | 0.50 | 1.88 | A | A |
| Example 17 | 77.00 | 2.00 | 7.10 | 6.60 | 6.80 | 0.50 | 1.88 | A | A |
| Example 18 | 75.00 | 4.00 | 7.10 | 6.60 | 6.80 | 0.50 | 1.88 | A | A |
| Example 19 | 71.00 | 8.00 | 7.10 | 6.60 | 6.80 | 0.50 | 1.88 | A | B |
| Example 20 | 68.00 | 11.00 | 7.10 | 6.60 | 6.80 | 0.50 | 1.88 | B | C |
| Comparative Example 4 | 79.00 | 0 | 7.10 | 6.60 | 6.80 | 0.50 | 1.88 | D | D |

Example 21

To (a) 1259 g of the compound (a-1), (b) 1 g of the compound (b-1), (c) 220 g of the compound (c-2), (d) 380 g of 2,5-dimercaptomethyl-1,4-dithiane (hereinafter referred to as "the compound (d-4)") and (e) 140 g of the compound (e-1), 20 g of 2-(2-hydroxy-5-t-octylphenyl)-2H-benzotriazole as an ultraviolet absorber, 0.2 g of Zelec UN (manufactured by Stepan) as a mold release agent and 2 g of tetra-n-butylphosphonium bromide as a polymerization catalyst were added, and the mixture was well mixed homogeneously at 20° C. After that, the obtained mixture was subjected to the deaeration treatment at a vacuum degree of 1.3 kPa, and the resin composition for an optical material was injected into (1) a mold for a semi-finished lens having a mold diameter of 75 mm, a central thickness of 7 mm and an edge thickness of 15 mm and (2) a mold for a minus lens having a mold diameter of 75 mm, a central thickness of 1 mm and an edge thickness of 10 mm, each of which was composed of two glass plates and a tape, and each of them was heated at 30° C. for 30 hours, then the temperature was elevated to 100° C. over 10 hours at a constant rate, and finally, each of them was heated at 100° C. for 1 hour to be polymerized and cured. After cooling, the obtained products were released from the molds and annealed at 110° C. for 60 minutes, and after that, the surface condition thereof was visually observed. The result regarding peeling traces on the obtained optical materials is shown in Table 5.

Example 22

The process was carried out in a manner similar to that in Example 21, except that (a) 1250 g of the compound (a-1) and (b) 10 g of the compound (b-1) were used. The result regarding peeling traces on the obtained optical materials is shown in Table 5.

Example 23

The process was carried out in a manner similar to that in Example 21, except that (a) 1220 g of the compound (a-1) and (b) 40 g of the compound (b-1) were used. The result regarding peeling traces on the obtained optical materials is shown in Table 5.

Example 24

The process was carried out in a manner similar to that in Example 21, except that (a) 1180 g of the compound (a-1) and (b) 80 g of the compound (b-1) were used. The result regarding peeling traces on the obtained optical materials is shown in Table 5.

Example 25

The process was carried out in a manner similar to that in Example 21, except that (a) 1140 g of the compound (a-1) and (b) 120 g of the compound (b-1) were used. The result regarding peeling traces on the obtained optical materials is shown in Table 5.

Example 26

The process was carried out in a manner similar to that in Example 21, except that (a) 940 g of the compound (a-1) and (b) 320 g of the compound (b-1) were used. The result regarding peeling traces on the obtained optical materials is shown in Table 5.

Comparative Example 5

The process was carried out in a manner similar to that in Example 21, except that (a) 1400 g of the compound (a-1), (c) 220 g of the compound (c-2), (d) 380 g of the compound (d-4) and (e) 140 g of the compound (e-1) were used without addition of the compound (b). The result regarding peeling traces on the obtained optical materials is shown in Table 5. Since the compound (b) was not used, peeling traces were generated.

TABLE 5

| Examples Comparative Examples | Composition (% by mass) | | | | | SH/ NCO ratio | Peeling traces Mold (1) | Peeling traces Mold (2) |
|---|---|---|---|---|---|---|---|---|
| | a-1 | b-1 | c-2 | d-4 | e-1 | | | |
| Example 21 | 62.95 | 0.05 | 11.00 | 19.00 | 7.00 | 1.58 | B | B |
| Example 22 | 62.50 | 0.50 | 11.00 | 19.00 | 7.00 | 1.58 | A | A |
| Example 23 | 61.00 | 2.00 | 11.00 | 19.00 | 7.00 | 1.58 | A | A |
| Example 24 | 59.00 | 4.00 | 11.00 | 19.00 | 7.00 | 1.58 | A | A |
| Example 25 | 57.00 | 6.00 | 11.00 | 19.00 | 7.00 | 1.58 | A | B |
| Example 26 | 47.00 | 16.00 | 11.00 | 19.00 | 7.00 | 1.58 | C | C |
| Comparative Example 5 | 63.00 | 0 | 11.00 | 19.00 | 7.00 | 1.58 | D | D |

Example 27

1464 g (10 mol) of bis(β-epoxypropyl)sulfide, 3048 g (40 mol) of thiourea and 120 g (1.2 mol) of acetic anhydride were fed together with 10 L of toluene and 10 L of methanol as solvents, the mixture was reacted at 20° C. for 5 hours and washed with 10% aqueous solution of sulfuric acid before the reaction was completed, and then the mixture was washed with water and the solvents were distilled away. The obtained compound was in an amount of 1520 g, and when it was analyzed by liquid chromatograph, it was a mixture in which the compound (a-1):the compound (b-1)=93:7.

The process was carried out in a manner similar to that in Example 15 using 1580 g of the mixture, (c) 142 g of the compound (c-3), (d) 132 g of the compound (d-3) and 136 g of the compound (d-1) and (e) 10 g of the compound (e-1). The result regarding peeling traces on the obtained optical materials is shown in Table 6.

Example 28

1464 g (10 mol) of bis((3-epoxypropyl)sulfide, 3048 g (40 mol) of thiourea and 120 g (1.2 mol) of acetic anhydride were fed together with 10 L of toluene and 10 L of methanol as solvents, the mixture was reacted at 22° C. for 7 hours and washed with 10% aqueous solution of sulfuric acid before the reaction was completed, and then the mixture was washed with water and the solvents were distilled away. The obtained compound was in an amount of 1520 g, and when it was analyzed by liquid chromatograph, it was a mixture in which the compound (a-1):the compound (b-1)=98:2.

The process was carried out in a manner similar to that in Example 15 using 1580 g of the mixture, (c) 142 g of the compound (c-3), (d) 132 g of the compound (d-3) and 136 g of the compound (d-1) and (e) 10 g of the compound (e-1). The result regarding peeling traces on the obtained optical materials is shown in Table 6.

Comparative Example 6

1464 g (10 mol) of bis(β-epoxypropyl)sulfide, 3048 g (40 mol) of thiourea and 120 g (1.2 mol) of acetic anhydride were fed together with 10 L of toluene and 10 L of methanol as solvents, the mixture was reacted at 30° C. for 10 hours and washed with 10% aqueous solution of sulfuric acid after the reaction was completed, and then the mixture was washed with water and the solvents were distilled away. The obtained compound was in an amount of 1515 g, and when it was analyzed by liquid chromatograph, it was the compound (a-1), and the compound (b-1) was not detected.

The process was carried out in a manner similar to that in Example 15 using (a) 1580 g of the obtained compound (a-1), (c) 142 g of the compound (c-3), (d) 132 g of the compound (d-3) and 136 g of the compound (d-1) and (e) 10 g of the compound (e-1). The result regarding peeling traces on the obtained optical materials is shown in Table 6.

TABLE 6

| Examples Comparative Examples | Composition (% by mass) | | | | | | SH/ NCO ratio | Peeling traces Mold (1) | Peeling traces Mold (2) |
|---|---|---|---|---|---|---|---|---|---|
| | a-1 | b-1 | c-3 | d-3 | d-1 | e-1 | | | |
| Example 27 | 73.47 | 5.53 | 7.10 | 6.60 | 6.80 | 0.50 | 1.88 | A | A |
| Example 28 | 77.42 | 1.58 | 7.10 | 6.60 | 6.80 | 0.80 | 1.88 | A | A |
| Comparative Example 6 | 79.00 | 0 | 7.10 | 6.60 | 6.80 | 0.50 | 1.88 | D | D |

The invention claimed is:

1. A composition for optical materials, which comprises (a) a compound described below, (b) a compound described below, (c) a polyisocyanate and (d) a polythiol:

the compound (a): a compound having the structure represented by the following formula (1):

wherein m represents an integer from 0 to 4, and n represents an integer from 0 to 2; and the compound (b): a compound having the structure represented by the following formula (2):

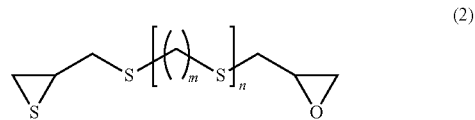

wherein m represents an integer from 0 to 4, and n represents an integer from 0 to 2, and wherein, when the total amount of the compound (a), the compound (b), the polyisocyanate (c) and the polythiol (d) is 100% by mass, the compound (a) is in an amount of 50 to 95% by mass; the compound (b) is in an amount of 0.05 to 20% by mass; the polyisocyanate (c) is in an amount of 1 to 25% by mass; and the polythiol (d) is in an amount of 1 to 25% by mass, and wherein the ratio of the SH groups in the polythiol (d) to the NCO groups in the polyisocyanate (c), [the number of the SH groups in the polythiol (d)/the number of the NCO groups in the polyisocyanate (c)] is 1.0 to 2.5.

2. The composition for optical materials according to claim 1, wherein the polyisocyanate (c) is at least one compound selected from the group consisting of isophorone diisocyanate, tolylene diisocyanate, diphenylmethane diisocyanate, hexamethylene diisocyanate, m-xylylene diisocyanate, p-xylylene diisocyanate, m-tetramethyl xylylene diisocyanate, p-tetramethyl xylylene diisocyanate, 1,3-bis(isocyanatemethyl)cyclohexane, 1,4-bis(isocyanatemethyl) cyclohexane, bis(isocyanatemethyl)norbornene and 2,5-diisocyanatemethyl-1,4-dithiane, and the polythiol (d) is at least one compound selected from the group consisting of bis(2-mercaptoethyl)sulfide, 2,5-dimercaptomethyl-1,4-dithiane, 1,3-bis(mercaptomethyl)benzene, 1,4-bis(mercaptomethyl)benzene, 4-mercaptomethyl-1,8-dimercapto-3,6-dithiaoctane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,3,3-tetrakis(mercaptomethylthio)propane, pentaerythritol tetrakis-mercaptopropionate, pentaerythritol tetrakis-thioglycolate, trimethylolpropane tris(thioglycolate) and trimethylolpropane tris(mercapto propionate).

3. The composition for optical materials according to claim 1, further comprising (e) a sulfur.

4. The composition for optical materials according to claim 3, wherein, when the total amount of the compound (a), the compound (b), the polyisocyanate (c), the polythiol (d) and the sulfur (e) is 100% by mass, the compound (a) is in an amount of 50 to 95% by mass; the compound (b) is in an amount of 0.05 to 20% by mass; the polyisocyanate (c)

is in an amount of 1 to 25% by mass; the polythiol (d) is in an amount of 1 to 25% by mass; and the sulfur (e) is in an amount of 0.1 to 15% by mass, and wherein the ratio of the SH groups in the polythiol (d) to the NCO groups in the polyisocyanate (c), [the number of the SH groups in the polythiol (d)/the number of the NCO groups in the polyisocyanate (c)] is 1.0 to 2.5.

5. A method for producing an optical material, which comprises the steps of:
   adding an onium salt, as a polymerization catalyst, to the composition for optical materials according to claim 1 in an amount of 0.0001 to 10% by mass relative to the total amount of the compound (a), the compound (b), the polyisocyanate (c) and the polythiol (d); and
   polymerizing and curing the resultant mixture.

6. A method for producing an optical material, which comprises the steps of:
   adding an onium salt, as a polymerization catalyst, to the composition for optical materials according to claim 3 in an amount of 0.0001 to 10% by mass relative to the total amount of the compound (a), the compound (b), the polyisocyanate (c), the polythiol (d) and the sulfur (e); and
   polymerizing and curing the resultant mixture.

7. An optical material obtained by the production method according to claim 5.

8. An optical lens comprising the optical material according to claim 7.

9. A method for producing the composition for optical materials according to claim 1, which comprises the steps of:
   reacting an epoxy compound represented by formula (3) below with thiourea to obtain a mixture of the compound (a) and the compound (b); and
   mixing the mixture with the polyisocyanate (c) and the polythiol (d):

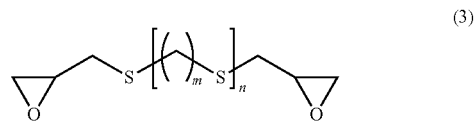

(3)

wherein m represents an integer from 0 to 4, and n represents an integer from 0 to 2.

10. A method for producing the composition for optical materials according to claim 3, which comprises the steps of:
   reacting an epoxy compound represented by formula (3) below with thiourea to obtain a mixture of the compound (a) and the compound (b); and
   mixing the mixture with the polyisocyanate (c), the polythiol (d) and the sulfur (e):

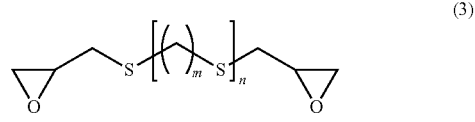

(3)

wherein m represents an integer from 0 to 4, and n represents an integer from 0 to 2.

* * * * *